United States Patent [19]
Lausberg et al.

[11] Patent Number: 5,237,000
[45] Date of Patent: Aug. 17, 1993

[54] IMPACT MODIFIED THERMOPLASTIC POLYURETHANE-POLYESTER MOLDING MATERIALS AND PREPARATION THEREOF

[75] Inventors: Dietrich Lausberg, Ludwigshafen; Rolf Steinberger, Schifferstadt; Knud Faehndrich, Diepholz; Harald Schulz, Vechta, all of Fed. Rep. of Germany

[73] Assignee: BASF Aktiengesellschaft, Ludwigshafen, Fed. Rep. of Germany

[21] Appl. No.: 578,687

[22] Filed: Sep. 7, 1990

[30] Foreign Application Priority Data

Sep. 28, 1989 [DE] Fed. Rep. of Germany ....... 3932359

[51] Int. Cl.$^5$ .................. C08L 51/04; C08L 67/02; C08L 75/04
[52] U.S. Cl. ....................... 525/64; 525/66; 525/440
[58] Field of Search .................. 525/66, 440, 64

[56] References Cited

U.S. PATENT DOCUMENTS

| | | | |
|---|---|---|---|
| 3,564,077 | 2/1971 | Brinkmann et al. | 525/174 |
| 3,919,353 | 11/1975 | Castelnuovo et al. | 525/64 |
| 4,179,479 | 12/1979 | Carter . | |

FOREIGN PATENT DOCUMENTS

| | | | |
|---|---|---|---|
| 1111984 | 11/1981 | Canada | 525/440 |
| 334186 | 9/1989 | European Pat. Off. . | |
| 3827568 | 2/1990 | Fed. Rep. of Germany . | |
| 3905008 | 8/1990 | Fed. Rep. of Germany . | |
| 2316283 | 1/1977 | France . | |
| 2328744 | 5/1977 | France . | |
| 2389661 | 12/1978 | France . | |

*Primary Examiner*—James J. Seidleck
*Assistant Examiner*—Thomas Hamilton, III
*Attorney, Agent, or Firm*—Oblon, Spivak, McClelland, Maier & Neustadt

[57] ABSTRACT

Impact modified thermoplastic polyurethane-polyester molding materials containing, based on 100 parts by weight of (A) to (C), A) from 30 to 90 parts by weight of at least one thermoplastic polyurethane elastomer, B) from 5 to 65 parts by weight of at least one thermoplastic polyester, preferably a polyalkylene terephthalate, and C) from 5 to 30 parts by weight of at least one graft rubber based on a polybutadiene (C1) or polyacrylate (C2) or a mixture of these graft rubbers and D) from 0 to 60% by weight of at least one fibrous or particulate filler and E) from 0 to 10% by weight of at least one assistant, the weight percentages being based on the weight of (A) to (C), are prepared by homogenizing the formative components at 190°–250° C.

7 Claims, No Drawings

IMPACT MODIFIED THERMOPLASTIC POLYURETHANE-POLYESTER MOLDING MATERIALS AND PREPARATION THEREOF

The present invention relates to impact modified thermoplastic polyurethane-polyester molding materials which contain A) at least one thermoplastic polyurethane elastomer, hereinafter abbreviated to TPU,
B) at least one thermoplastic polyester, hereinafter abbreviated to PES, and
C) at least one graft rubber based on a polybutadiene (C1) or polyacrylate (C2), and optionally
D) fillers and/or
E) assistants.

Thermoplastic molding materials from TPU and PES are known.

Materials of improved low temperature impact toughness as described in DE-A-26 46 647 (GB 1 513 197) consist of an intimate mixture of from 50 to 70 parts by weight of TPU and from 25 to 50% by weight of a polybutylene terephthalate, also known as PBT. CA-A-1 111 984 likewise describes TPU/PBT materials which, however, based on the total weight, consist of from 5 to 95% by weight of TPU and from 95 to 5% by weight of PBT. These TPU/PBT molding materials, however, have the disadvantage of inadequate notched impact strength and insufficient multiaxial toughness, in particular at low temperatures.

TPU mixtures which contain processing aids and are composed of from 40 to 100% by weight of TPU, from 0 to 60% by weight of a thermoplastic polymer selected from the group consisting of polycarbonates, polyoxymethylenes, acrylonitrile-butadiene-styrene graft copolymers, PBT, polyethylene terephthalate and mixtures thereof, and from 0.5 to 10% by weight, based on the total weight of TPU and the other thermoplastic polymer, of a polyacrylate-based processing aid selected from the group consisting of a methyl methacrylate homopolymer, a methyl methacrylate/n-butyl methacrylate or methyl methacrylate/ethyl acrylate copolymer and a terpolymer of methyl methacrylate, n-butyl acrylate and styrene are known from U.S. Pat. No. 4,179,479. However, these materials based on TPU, PBT or polyethylene terephthalate and the essentially linear (meth)acrylate homopolymer or copolymer possess unsatisfactory toughness at low temperatures and are difficult to process.

It is an object of the present invention to remove the aforementioned disadvantages as completely as possible and to develop TPU/PES molding materials which possess a distinctly improved low temperature toughness and are easy to process into shaped articles.

We have found, surprisingly, that this object is achieved by introducing at least one graft rubber (C) based on a polybutadiene (C1) or polyacrylate (C2) into TPU/PES molding materials of defined composition.

The present invention accordingly provides impact modified thermoplastic polyurethane-polyester molding materials which contain or preferably consist of, based on 100 parts by weight of (A) to (C), A) from 30 to 90 parts by weight, preferably from 40 to 80 parts by weight, of at least one TPU (A),
B) from 5 to 65 parts by weight, preferably from 10 to 60 parts by weight, of at least one PES (B) and
C) from 5 to 30 parts by weight, preferably from 5 to 20 parts by weight, of at least one graft rubber (C) based on a
C1) polybutadiene or
C2) polyacrylate
or a mixture of graft rubbers based on (C1) and (C2) and also, based on the total weight of (A) to (C),
D) from 0 to 60% by weight, preferably from 2 to 50% by weight, of at least one fibrous or particulate filler and
E) from 0 to 10% by weight, preferably from 0 to 5% by weight, of at least one assistant.

The present invention further provides a process for preparing the TPU/PES molding materials according to the present invention by homogenizing the formative components at 190°-250° C. in a suitable mixing apparatus as mentioned in claim 12.

As mentioned, the TPU/PES molding materials according to the present invention have very good low temperature toughness. It is also worth mentioning their very good processibility into shaped articles by means of the injection molding technique, the short cycle times required for this purpose and the good demoldability. The TPU/PES molding materials also possess excellent resistance to organic solvents.

The TPUs (A) usable for preparing the TPU/PES molding materials according to the present invention correspond to the prior art and can be prepared by reacting a) organic, preferably aromatic, diisocyanates, in particular 4,4'-diphenylmethane diisocyanate, with
b) polyhydroxy compounds, preferably essentially linear polyhydroxy compounds, having molecular weights of from 500 to 800, in particular polyalkylene glycol polyadipates having from 2 to 6 carbon atoms in the alkylene moiety and molecular weights of from 500 to 6000 or hydroxyl-containing polytetrahydrofuran having a molecular weight of from 500 to 8000, and
c) diols as chain extenders having molecular weights of from the 60 to 400, in particular 1,4-butanediol.

in the presence of d) catalysts and optionally
e) aids and/or
f) additives at elevated temperatures.

The TPU-forming components (a) to (d) and optionally (e) and/or (f) may be described in detail as follows:

a) Suitable organic diisocyanates (a) are for example aliphatic, cycloaliphatic and preferably aromatic diisocyanates. Specific examples are: aliphatic diisocyanates such as 1,6-hexamethylene diisocyanate, 2-methyl-1,5-pentamethylene diisocyanate, 2-ethyl-1,4-butylene diisocyanate and mixtures of at least two of said aliphatic diisocyanates, cycloaliphatic diisocyanates such as isophorone diisocyanate, 1,4-cyclohexane diisocyanate, 1-methyl-2,4-cyclohexane diisocyanate and 1-methyl-2,6-cyclohexane diisocyanate and the corresponding isomeric mixtures, 4,4'-, 2,4'- or 2,2'-dicyclohexylmethane diisocyanate and the corresponding isomeric mixtures and preferably aromatic diisocyanates such as 2,4-toluylene diisocyanate, mixtures of 2,4- and 2,6-toluylene diisocyanate, 4,4'-, 2,4'- and 2,2'-diphenylmethane diisocyanate, mixtures of 2,4'- and 4,4'-diphenylmethane diisocyanate, urethane-modified liquid 4,4'- and/or 2,4'-diphenylmethane diisocyanates, 4,4'-diisocyanato-1,2-diphenylethane, mixtures of 4,4'-2,4- and 2,2'-diisocyanato-1,2-diphenylethane, preferably those having a 4,4'-diisocyanato-1,2-diphenylethane content of at least 95% by weight, and 1,5-naphthylene diisocyanate. Preference is given to using diphenylmethane diisocyanate isomer mixtures having a 4,4'-diphenylmethane diisocyanate content of greater than 96% by weight and in particular essentially pure 4,4'-diphenylmethane diisocyanate.

The organic diisocyanate may be replaced to a minor extent, for example in an amount of up to 3 mol %, preferably up to 1 mol %, based on the organic diisocyanate, by a trifunctional or more highly functional polyisocyanate, the amount of which, however, must be limited in such a way as to produce a still thermoplastic polyurethane. A major amount of such tri- or more highly functional isocyanates is advantageously balanced by the inclusion of less than difunctional compounds having reactive hydrogen atoms, in order that excessive chemical crosslinking of the polyurethane may be avoided. Examples of more than difunctional isocyanates are mixtures of diphenylmethane diisocyanate and the polyphenylpolymethylene polyisocyanates, so-called crude MDI, and liquid 4,4'-and/or 2,4'-diphenylmethane diisocyanates modified with isocyanurate, urea, biuret, allophanate, urethane and/or carbodiimide groups.

Suitable monofunctional compounds having reactive hydrogen atoms which are also usable as molecular weight regulators are for example: monoamines such as butylamine, dibutylamine, octylamine, stearylamine, N-methylstearylamine, pyrrolidone, piperidine and cyclohexylamine and monoalcohols such as butanol, amyl alcohol, 1-ethylhexanol, octanol, dodecanol, cyclohexanol and ethylene glycol monoethyl ether.

b) Preferred polyhydroxy compounds (b) having molecular weights of from 500 to 8000 are polyetherols and in particular polyesterols. However, it is also possible to use other hydroxyl-containing polymers containing ether or ester groups as bridge members, for example polyacetals, such as polyoxymethylenes and in particular water-soluble formals, e.g. polybutanediol formal and polyhexanediol formal, and polycarbonates, in particular those formed from diphenyl carbonate and 1,6-hexanediol, prepared by transesterification. The polyhydroxy compound must be at least predominantly linear, i.e., difunctional within the meaning of the isocyanate reaction. The polyhydroxy compounds mentioned may be used as individual components or in the form of mixtures.

Suitable polyetherols can be prepared from one or more alkylene oxides having from 2 to 4 carbon atoms in the alkylene moiety in a conventional manner, for example by anionic polymerization with alkali metal hydroxides, such as sodium hydroxide or potassium hydroxide, or alkali metal alcoholates, such as sodium methoxide, sodium ethoxide, potassium ethoxide or potassium isopropoxide, as catalysts and in the presence of at least one initiator molecule which contains 2 to 3, preferably 2 reactive hydrogen atoms, or by cationic polymerization with Lewis acids, such as antimony pentachloride, boron fluoride etherate, etc. or bleaching earth, as catalysts.

Preferred alkylene oxides are for example tetrahydrofuran, 1,3-propylene oxide, 1,2-butylene oxide, 2,3-butylene oxide and in particular ethylene oxide and 1,2-propylene oxide. The alkylene oxides may be used individually, alternately in succession or as mixtures. Suitable initiator molecules are for example: water, organic dicarboxylic acids, such as succinic acid, adipic acid and/or glutaric acid, alkanolamines, such as ethanolamine, N-alkylalkanolamines, N-alkyldialkanolamines, e.g. N-methyl- and N-ethyl-diethanolamine, and preferably dihydric alcohols which may contain ether linkages, e.g. ethanediol, 1,2-propanediol, 1,3-propanediol, 1,4-butanediol, diethylene glycol, 1,5-pentanediol, 1,6-hexanediol, dipropylene glycol, 2-methyl-1,5-pentanediol and 2-ethyl-1,4-butanediol. The initiator molecules may be used individually or as mixtures.

Preference is given to using polyetherols from 1,2-propylene oxide and ethylene oxide in which more than 50%, preferably from 60 to 80%, of the OH groups are primary hydroxyl groups and where at least some of the ethylene oxide units are present as a terminal block. Such polyetherols can be obtained by, for example, polymerizing onto the initiator molecule first the 1,2-propylene oxide and then the ethylene oxide, or first the entire 1,2-propylene oxide mixed with some of the ethylene oxide and then the remainder of the ethylene oxide, or step by step first some of the ethylene oxide, then the entire 1,2-propylene oxide and then the remainder of the ethylene oxide.

Other preferred possibilities are the hydroxyl-containing polymerization products of tetrahydrofuran.

The essentially linear polyetherols have molecular weights of from 500 to 8000, preferably from 600 to 6000, in particular from 800 to 3500, the polyoxytetramethylene glycols preferably having molecular weights of from 500 to 2800. They can be used not only individually but also in the form of mixtures with one another.

Suitable polyesterols may be prepared for example from dicarboxylic acids of from 2 to 12, preferably from 4 to 6, carbon atoms and polyhydric alcohols. Suitable dicarboxylic acids are for example: aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or as mixtures, for example in the form of a mixture of succinic acid, glutaric acid and adipic acid. To prepare the polyesterols it may be advantageous to use instead of the dicarboxylic acids the corresponding dicarboxylic acid derivatives, such as dicarboxylic monoesters or diesters having from 1 to 4 carbon atoms in the alcohol moiety, dicarboxylic anhydrides or dicarbonyl dichlorides. Examples of polyhydric alcohols are glycols of from 2 to 10, preferably from 2 to 6, carbon atoms, such as ethylene glycol, diethylene glycol, 1,4-butanediol, 1,5-pentanediol, 1,6-hexanediol, 1,10-decanediol, 2,2-dimethylpropane-1,3-diol, 1,3-propanediol and dipropylene glycol. Depending on the properties which are desired, the polyhydric alcohols may be used alone or optionally mixed with one another.

It is also possible to use esters of carbonic acid with the diols mentioned, in particular those having from 4 to 6 carbon atoms, such as 1,4-butanediol and/or 1,6-hexanediol, condensation products of ω-hydroxycarboxylic acids, e.g. ω-hydroxycaproic acid, and preferably polymerization products of lactones, for example substituted or unsubstituted ω-caprolactones.

Preferred polyesterols are ethanediol polyadipates, 1,4-butanediol polyadipates, ethanediol/1,4-butanediol polyadipates, 1,6-hexanediol/neopentylglycol polyadipates, 1,6-hexanediol/1,4-butanediol polyadipates and polycaprolactones.

The polyesterols have molecular weights of from 500 to 6000, preferably from 800 to 3500.

c) Suitable chain extenders (c) having molecular weights of from 60 to 400, preferably from 60 to 300, are preferably aliphatic diols of from 2 to 12 carbon atoms, preferably of 2, 4 or 6 carbon atoms, e.g. ethanediol, 1,6-hexanediol, diethylene glycol, dipropylene glycol and in particular 1,4-butanediol. However, it is also possible to use diesters of terephthalic acid with glycols of from 2 to 4 carbon atoms, e.g. bisethylene glycol terephthalate, 1,4-butanediol terephthalate, and hydroxyalkylene ethers of hydroquinone, e.g. 1,4-di-($\beta$-hydroxyethyl)-hydroquinone, and also polytetramethylene glycols having molecular weights of from 162 to 378.

To set the hardness and the melt flow index, the formative components can be varied within relatively wide molar ratios bearing in mind that the hardness and melt viscosity increase with an increasing level of chain extenders (c) while the melt flow index decreases.

To prepare relatively soft TPUs (A), for example those having a Shore A hardness of less than 95, preferably from 95 to 75, it is advantageous for example to use the essentially difunctional polyhydroxy compounds (b) and the diols (c) in a molar ratio of from 1:1 to 1:5, preferably from 1:1.5 t 1:4.5, so that the resulting mixtures of (b) and (c) have a hydroxy equivalent weight of greater than 200, in particular form 239 to 450, while harder TPUs (a), for example those having a Shore A hardness of greater than 98, preferably from 55 to 75 Shore D, are prepared using a molar ratios of (b):(c) within the range from 1:5.5. to 1:15, preferably from 1:6 to 1:12, so that the resulting mixtures of (b) and (c) have a hydroxy equivalent weight of from 110 to 200, preferably from 120 to 180.

d) Suitable catalysts, in particular for the reaction between the NCO groups of the diisocyanates (a) and the hydroxyl groups of the formative components (b) and (c), are the customary tertiary amines, such as triethylamine, dimethylcyclohexylamine, N-methylmorpholine, N,N'-dimethylpiperazine, diazabicyclo[2.2.2]octane and the like, in particular organic metal compounds such as titanic esters, iron compounds, tin compounds, e.g. tin diacetate, tin dioctoate, tin dilaurate or the tin dialkyl salts of aliphatic carboxylic acids such as dibutyltin diacetate, dibutyltin dilaurate and the like. The catalysts are customarily used in amounts of from 0.001 to 0.1 parts by weight per 100 parts by weight of the mixture of polyhydroxy compounds (b) and diols (c).

In addition to catalysts, the formative components may also contain aids (e) and/or additives (f). Examples are lubricants, inhibitors, stabilizers against hydrolysis, light, heat or discoloration, flame retardants, dyes, pigments, inorganic and/or organic fillers and reinforcing agents.

The aids (e) and/or additives (f) may be introduced into the formative components or into the reaction mixture for preparing the TPUs (A). Alternatively, the aids (e) and/or additives (f), which may be identical to the assistant (E), may be mixed with the TPU (A), the PES (B) and/or the graft rubber (C) and then melted, or they are incorporated directly into the melt of components (A), (B) and (C). The latter method is also adopted in particular for incorporated the fibrous and/or particulate fillers (D).

Where, in what follows, no details are provided concerning the usable aids or additives, they can be discerned from the relevant technical literature, for example J. H. Saunders and K. C. Frisch's monograph, High Polymers, volume XVI, Polyurethanes, parts 1 and 2 (Interscience Publishers 1962 and 1964 respectively), Kunststoff Handbuch, volume 7, Polyurethanes, 1st and 2nd editions (Carl Hanser Verlag 1966 and 1983 respectively), or DE-A-2,901,774.

To prepare the TPUs (A), the formative components (a), (b) and (c) are made to react in the presence of a catalyst (d) and in the presence or absence of aids (e) and/or additives (f) in such amounts that the equivalence ratio of the diisocyanate NCO groups to the total number of hydroxyl groups of components (b) and (c) is from 0.95 to 1.10:1, preferably 0.98 to 1.08:1, in particular approximately 1.0 to 1.05:1.

The TPUs (A) which are usable according to the present invention and which customarily contain from 8 to 20% by weight, preferably from 8 to 16% by weight, based on the total weight, of urethane groups and have a melt flow index at 210° C. of from 500 to 1, preferably from 100 to 1, can be prepared by the extruder technique or preferably the belt technique by batchwise or continuous mixing of formative components (a) to (d) and optionally (e) and/or (f), reacting the mixture in an extruder or on a support belt at from 60° to 250° C., preferably at from 70° to 150° C., and then granulating the resulting TPUs (A). It may be advantageous to heat the resulting TPU (A) at from 80° to 120° C., preferably at from 100° to 110° C., for a period of from 1 to 24 hours before further processing into the TPU/PES molding materials according to the present invention.

The TPUs (A) are, as mentioned, preferably prepared by the belt technique. To this end, the formative components (a) to (d) and optionally (e) and/or (f) are continuously mixed with the air of a mixing head at above the melting point of formative components (a) to (c). The reaction mixture is brought out onto a support, preferably a conveyor belt, for example a metal belt, and is passed at 1–20 m/min, preferably 4–10 m/min, through a hot zone from 1 to 20 m, preferably from 3 to 10 m, in length. The temperature in the hot zone is 60°–200° C., preferably 80°–180° C. Depending on the diisocyanate content of the reaction mixture, the reaction is controlled by cooling or heating in such a way that at least 90%, preferably at least 98%, of the isocyanate groups of the diisocyanates react and the reaction mixture solidifies at the chosen reaction temperature. Owing to the free isocyanate groups in the solidified reaction product, which based on the total weight are within the range from 0.05 to 1% by weight, preferably from 0.1 to 0.5% by weight, the TPUs (A) obtained have a very low melt viscosity or a high melt flow index.

B) Formative component (B) of the TPU/PES molding materials according to the present invention is, as mentioned, an amount, based on 100 parts by weight of (A), (B) and (C), of from 5 to 65 parts by weight, preferably from 10 to 60 parts by weight, in particular 12 to 50 parts by weight, of one or more thermoplastic polyesters. Polyesters suitable for this purpose are described in the literature. They contain in the polycondensate main chain at least one aromatic ring derived from an aromatic dicarboxylic acid. The aromatic ring may also be substituted, for example by halogen, e.g. chlorine or bromine, or/and by linear or branched alkyl, preferably of from 1 to 4 carbon atoms, in particular of 1 or 2 carbon atoms, e.g. methyl, ethyl, isopropyl, n-propyl, n-butyl, isobutyl or tert-butyl.

The polyesters can be prepared by polycondensation of aromatic dicarboxylic acids or mixtures of aromatic and aliphatic and/or cycloaliphatic dicarboxylic acids and the corresponding ester-forming derivatives, for example dicarboxylic anhydrides, monoesters and/or diesters having advantageously not more than 4 carbon atoms in the alcohol moiety, with aliphatic dihydroxy compounds at elevated temperatures, for example at from 160° to 260° C., in the presence or absence of esterification catalysts.

The preferred aromatic dicarboxylic acids are the naphthalenedicarboxylic acids, isophthalic acid and in particular terephthalic acid or mixtures of these dicarboxylic acids. If mixtures or aromatic and (cyclo)aliphatic dicarboxylic acids are used, up to 10 mol % of the aromatic dicarboxylic acids may be replaced by aliphatic and/or cycloaliphatic dicarboxylic acids or advantageously 1-14 carbon atoms, e.g., succinic, adipic, azelaic, sebacic or dodecanedioic acid and/or cyclohexanedicarboxylic acid.

The preferred aliphatic dihydroxy compounds are alkanediols of from 2 to 6 carbon atoms and cycloalkanediols of from 5 to 7 carbon atoms. Specific examples of preferred aliphatic dihydroxy compounds are 1,2-ethanediol, 1,4-butanediol, 1,6-hexanediol, neopentylglycol and 1,4-cyclo hexanediol and mixtures of at least two of said diols.

Particularly suitable PES's (B) are specifically the polyalkylene terephthalates of alkanediols of from 2 to 6 carbon atoms, so that polyethylene terephthalate and in particular polybutylene terephthalate are preferred.

The relative viscosity of the PBS's (B) is in general within the range from 1.2 to 1.8, measured in a 0.5% strength by weight solution in 1:1 w/w phenol/o-dichlorobenzene at 25° C.

C) The TPU/PES molding materials according to the present invention contain one or more graft rubbers (C) based on a polybutadiene (C1) or polyacrylate (C2) or a mixture of graft rubbers based on (C1) and (C2) as an additional formative components for improving the toughness, in particular the low-temperature impact toughness, and the processibility. As mentioned, the proportion of graft rubber (C) is, based on 100 parts by weight of the molding materials consisting of (A), (B) and (C), from 5 to 30 parts by weight, preferably from 5 to 20 parts by weight, in particular from 10 to 20 parts by weight.

Suitable graft rubbers based on polybutadiene (C1) are composed of a grafting base (C11) which advantageously consists of a polybutadiene, a polyisoprene, a butadiene-styrene copolymer or a copolymer of styrene or an alkylstyrene, e.g. α-methylstyrene, and conjugated dienes (high impact polystyrenes), and a graft (C12) prepared by polymerization of styrene, alkylstyrene, e.g. α-methylstyrene, acrylonitrile, alkyl acrylate or methacrylate, having from 1 to 8 carbon atoms in the alkyl moiety, preferably methyl (meth)acrylate, or vinyl acetate or by copolymerization of at least two of said monomers, e.g. styrene and/or acrylonitrile and/or (meth)acrylic esters. Graft rubbers of the type mentioned (C1) are described for example in DE-A-16 94 173 (U.S. Pat. No. 3,564,077) and De-A-23 48 377 (U.S. Pat. No. 3,919,353). It is also possible to use ABS polymers as described for example in De-A-20 35 390 (U.S. Pat. No. 3,644,574) and in DE-A-22 48 242 (GB-A-1 409 275).

Preference is given to using graft rubbers based on polybutadiene (C1) and composed of C11) 60-90% by weight, preferably 65-90% by weight, in particular 75-85% by weight, based on the weight of (C11) and (C12), of a butadiene polymer containing at least 50% by weight, preferably at least 70% by weight, based on (C11), of butadiene radicals as grafting base and C12) 10-40% by weight, preferably 10-35% by weight, in particular 15-25% by weight, based on the weight of (C11) and (C12), of a graft or sheath prepared by graft polymerization of an alkyl acrylate or methacrylate or graft copolymerization of a mixture consisting of 10-35% by weight, preferably 20-35% by weight, based on the weight of the mixture, of acrylonitrile and 65-90% by weight, preferably 65-80% by weight, based on the weight of the mixture, of styrene or by graft copolymerization of the aforementioned acrylonitrile-styrene mixture with at least one alkyl acrylate and/or methacrylate, the alkyl (meth)acrylates being monoesters of acrylic or methacrylic acid with alcohols which have from 1 to 8 carbon atoms and may contain further functional groups, e.g. ether groups or preferably epoxy or hydroxyl groups.

The grafting base (C11) advantageously contains, as mentioned above, at least 50% by weight, based on (C11), of butadiene radicals, in which case the preferred grafting base consists of pure polybutadiene. If the grafting base consists f a polybutadiene copolymer, the residues of other ethylenically unsaturated monomers present therein are advantageously: styrene, acrylonitrile and acrylate or methacrylate radicals of alkyl (meth)acrylates containing from 1 to 4 carbon atoms in the alkyl moiety, e.g. methyl (meth)acrylate or ethyl (meth)acrylate. The grafting base (C11) preferably has a gel content of from 70% by weight, measured in toluene.

The polybutadiene-based graft rubbers (C1) have a median particle diameter $d_{50}$ of from 0.05 to 0.6 μm, preferably of from 0.08 to 0.5 μm, and exhibit a degree of grafting G of from 0.15 to 0.55, preferably of from 0.2 to 0.4. The degree of grafting G indicates the weight ratio of grafted-on monomer to the grafting base and is dimensionless. The medial particle diameter $d_{50}$ is that diameter which is less than the diameter possessed by 50% by weight of the particles and greater than the diameter possessed by 50% by weight of the particles. It can be determined by means of ultracentrifuge measurements (W. Scholtan, H. Lange, Kolloid. Z. and Z. Polymere 250 (1972), 782-796) or by means of electron microscopy and subsequent particle counting (G. Kämpf, H. Schuster, Angew. Makromolekulare Chemie 14 (1970), 111-129) or by means of light scattering measurements.

Since, as will be known, the grafting monomers (C12) are not completely grafted onto the grafting base (C11), the polybutadiene-based graft rubbers (C1) usable according to the present invention also contain homopolymers and possible copolymers of the grafting monomers (C12) as well as the actually grafted polymers.

C2) Suitable graft rubbers based on polyacrylates (C2) are composed of

C21) a grafting base consisting of an acrylate rubber having a glass transition temperature of below −20° C. and C22) a graft prepared by graft polymerization of at least one polymerizable ethylenically unsaturated monomer whose homopolymer or copolymers formed in the absence of (C21) would have a glass transition temperature of above 25° C.

Preferred grafting monomers for forming the graft (C22) are styrene, alkylstyrene, e.g. α-methylstyrene, acrylonitrile, alkyl acrylates or methacrylates, e.g. methyl methacrylate, and mixtures of at least two of said monomers. Preferred grafting monomer mixtures are those between styrene and acrylonitrile in a weight ratio of from 90:10 to 50:50.

The polyacrylate-based graft rubbers (C2) consist advantageously of

C21) 25–98% by weight, preferably 50–90% by weight, based on the total weight of (C2), of (C21) and C22) 2–75% by weight, preferably 10–50% by weight, based on the total weight of (C2), or (C22).

The acrylate rubbers (C21) which come into consideration for use as grafting bases are preferably polymers of alkyl acrylates which may contain up to 50% by weight, based on the total weight, of units of other polymerizable, ethylenically unsaturated monomers as copolymerizable, units. If the acrylate rubbers used as grafting base (C21) in turn are already graft polymers having a diene rubber core, the diene rubber core is not included in the calculation of the aforementioned percentage. The preferred polymerizable alkyl acrylates include those having from 1 to 8 carbon atoms in the alkyl moiety, e.g. methyl, ethyl, butyl, octyl or 2-ethylhexyl acrylate. It is also possible to use haloalkyl, acrylates, preferably halo-$C_1$–$C_8$-alkyl acrylates, e.g. chloroethyl acrylate, and arylalkyl acrylates, e.g. benzyl or phenylethyl acrylate. The alkyl acrylates mentioned can be used individually or in the form of mixtures.

The acrylate rubbers (C21) may be uncrosslinked, crosslinked or preferably partially crosslinked.

The crosslinking may be brought about by copolymerizing the alkyl acrylates with suitable monomers which have more than one copolymerizable double bond. Examples of such crosslinking monomers are carboxylic esters prepared from olefinically unsaturated monocarboxylic acids of from 3 to 8 carbon atoms and olefinically unsaturated monohydric alcohols of from 3 to 12 carbon atoms or saturated at least dihydric, preferably dihydric, trihydric or tetrahydric, alcohols of from 2 to 20 carbon atoms, e.g. allyl methacrylate or an alkylene glycol di(meth)acrylate. It is also possible to use polyunsaturated heterocyclic compounds, such as trivinyl or triallyl cyanurate or isocyanurate, trisacryloyl-s-triazines, polyfunctional vinyl compounds, e.g. di- and trivinylbenzene and also triallyl phosphate, dicyclodihydropentadienyl acrylate or/and diallyl phthalate.

It is particularly advantageous and hence preferable to use butanediol diacrylate, dicyclopentadienyl acrylate and butadiene.

The amount of crosslinking monomer is preferably from 0.02 to 10% by weight, in particular form 0.05 to 5% by weight, based on the weight of the grafting base (C21).

If cyclic crosslinking monomers having at least three ethylenically unsaturated groups are used, it is advantageous to limit their amount to 1% by weight of the grafting base (C21).

Other suitable polymerizable ethylenically unsaturated monomers which may e used for preparing the grafting base (C21) besides alkyl acrylates are for example acrylonitrile, styrene, α-methylstyrene, acrylamides and vinyl $C_1$–$C_8$-alkyl ethers.

The acrylate rubbers preferably used as grafting base (C21) are emulsion polymers which have a gel content of 60% by weight, measured at 25° C. in dimethylformamide (M. Hoffmann, H. Krömer, R. Kuhn, Polymeranalytic I and II, Georg-Thieme-Verlag Stuttgart 1977).

A grafting base (C21) may also be acrylate rubber with a core comprising a diene rubber formed from one or more conjugated dienes, such as polybutadiene, or a copolymer of a conjugated diene with an ethylenically unsaturated monomer, such as styrene and/or acrylonitrile.

The polydiene core content of the grafting base (C21) may range form 0.1 to 50% by weight, preferably from 10 to 40% by weight, based on (C21). Here the grafting base (C21) and the graft or sheath may each be independently of the other uncrosslinked or partially or completely crosslinked.

Particularly preferred grafting bases (C21) for polyacrylate-based graft rubbers (C2) are thus: alkyl acrylate homopolymers and copolymers without a core of diene rubber and alkyl acrylate homopolymers and copolymers with a core of diene rubber.

The graft yield, i.e. the ratio of the weight of grafted-on monomer (or the weight of the graft sheath) to the weight of the grafting monomers used, is in general from 20 to 80%, preferably from 40 to 80%. The graft yield is determined as described by M. Hoffmann, H. Krömer and R. Kuhn in Polymeranalytik, volume 1, Georg-Thieme-Verlag Stuttgart 1977.

Graft rubbers (C) based on polyacrylates (C2) which are usable according to the present invention are described for example in DE-B-24 44 584 (U.S. Pat No. 4,022,748) and DE-A-27 26 256 (U.S. Pat. No. 4,096,202).

Polyacrylate-based graft rubbers (C2) of this kind can also be obtained by grafting 2–20% by weight, preferably 2–15% by weight, based on the weight of (C2), of a grafting monomer selected from the group consisting of the alkyl acrylates, alkyl methacrylates having from 1 to 8 carbon atoms in the alkyl moiety, styrene, α-methylstyrene, acrylonitrile and vinyl acetate and mixtures of at least two grafting monomers onto 80–98% by weight, preferably 85–98% by weight, based on the weight of (C2), of a completely broken, aqueous latex of the grafting base (C21) in the absence of a suspending aid. The resulting pulverulent graft rubber (C2) may then be dried and homogenized in the desired ratio with the formative components (A) and (B) by the action of shearing force in such a way that the median particle size $d_{50}$ of (C2) in a TPU/PES molding material according to the present invention is from 0.05 to 3 μm, preferably from 0.1 to 2μm, in particular from 0.2 to 1 μm.

The expression "in the absence of a suspending air" indicates for the purposes of the present invention the absence of substances which, by quality and quantity, are capable of suspending the aforementioned grafting monomers in the aqueous phase. However, this definition does not rule out the presence of substances which may have had a suspending effect for example in the preparation of a grafted grafting base (C21). In such cases the coagulant or precipitant used for breaking the latex of the grafting base (C21) must be added in an amount which outweighs the suspending effect of substances used for forming the grafted grafting base (C21); that is, care must be taken to ensure that the grafting monomers for forming the graft do not form stable emulsions in the aqueous phase.

The grafting base (C21) may also comprise an acrylate rubber in the form of an aqueous emulsion (latex) where the latex particles contain as copolymerized units 1 to 20% by weight, preferably from 1 to 10% by weight, based on (C21), of monomers previously grafted-on in aqueous emulsion, preferably alkyl (meth)acrylates, styrene, α-methylstyrene, acrylonitrile and/or vinyl acetate, which in the form of their homopolymers or copolymers would have a glass transition temperature of 0° C.

Such grafting bases (C21) are obtained for example by emulsion graft polymerization. Alternatively, the acrylate rubbers can be prepared by solution or bulk polymerization, the grafting monomers can be grafted on, and the resulting rubbers can then be converted into an aqueous emulsion suitable for further graft polymerization processes.

Suitable grafting bases (C21) for polyacrylate-based graft rubbers prepared by this particular embodiment are thus not only the above-described grafting bases but also graft polymers prepared in aqueous emulsion from acrylate polymers and copolymers which may contain a core of diene rubber and ethylenically unsaturated polymerizable monomers.

The graft rubbers based on a polybutadiene (C1) or on a graft acrylate (C2) which are usable according to the present invention for impact modification can be used alone or as mixtures. It is also possible to use mixtures of graft rubbers based on (C1) and (C2).

The impact modified thermoplastic TPU/PES molding materials according to the present invention may in addition to the essential components (A), (B) and (C) optionally also contain fibrous and/or particulate fillers (D) and/or assistants (E).

D) The proportion of filler (D) is customarily from 0 to 60% by weight, preferably from 2 to 50% by weight, in particular from 5 to 30% by weight, based on the total weight of components (A) to (C).

Suitable particulate fillers are for example: organic fillers, such as carbon black, chlorinated polyethylenes and melamine, and inorganic fillers such as wollastonite, calcium carbonate, magnesium carbonate, amorphous silica, calcium silicate, calcium metasilicate, quartz powder, talc, kaolin, mica, feldspar, glass spheres, silicon nitride, boron nitride and mixtures thereof.

Particularly suitable reinforcing fillers which are therefore preferred are fibers, for example carbon fibers and in particular glass fibers, with or without an adhesion promoting or/and size finish. Suitable glass fibers, which are also for example in the form of glass weaves, mats, webs and/or preferably glass filament rovings or chopped glass filament formed from low-alkali E-glasses from 5 to 200 μm, preferably from 6 to 15 μm, in diameter, generally have a mean fiber length of from 0.05 to 1 mm, preferably from 0.1 to 0.5 mm, after incorporation into the TPU/PES molding materials.

Of the aforementioned particulate or fibrous reinforcing filers, glass fibers in particular are advantageous, in particular when a high heat resistance or very high stiffness is required.

E) As mentioned, the TPU/PES molding materials according to the present invention may also contain assistants (E). The assistants can be identical to the customary aids (c) or additives (f) used for preparing TPUs and therefore already be present in the TPU (A). The proportion of assistant (E) is in general from 0 to 10% by weight, preferably from 0 to 5% by weight, based on the total weight of formative components (A) to (C). Such assistants are for example: nucleating agents, antioxidants, stabilizers, lubricants, demolding agents and dyes.

The nucleating agent used can be for example talc, calcium fluoride, sodium phenylphosphinate, aluminum oxide or finely-divided polytetrafluoroethylene in an amount of up to 5% by weight, based on the weight of formative components (A) to (C).

Suitable antioxidants and heat stabilizers which may be added to the TPU/PES molding materials are for example halides of metals of group I of the periodic table, for example halides or sodium potassium or lithium, alone or combined with copper(I) halides e.g. chlorides, bromides or iodides, sterically hindered phenols, hydroquinones and also substituted compounds of these groups and mixtures thereof, which are preferably used in concentrations of up to 1% by weight, based on the weight of formative components (A) to (C).

Examples of UV stabilizers are various substituted resorcinols, salicylates, benzotriazoles and benzophenones and also sterically hindered amines, which in general are used in amounts of up to 2.0% by weight, based on the weight of formative components (A) to (C).

Lubricants and demolding agents which in general are likewise added in amounts of up to 1% by weight based on the weight of formative components (A) to (C), are $C_{12}$–$C_{36}$-fatty acids, for example stearic acids, fatty alcohols, e.g. stearyl alcohol, fatty acid esters or amides, e.g. stearic esters and stearamides, and also the fatty acid esters of pentaerythritol and montan ester waxes.

It is also possible to add organic dyes, e.g. nigrosine, and pigments, e.g. titanium dioxide, cadmium sulfide, cadmium sulfide selenide, phthalocyanines, ultramarine blue or carbon black, in amounts of for example up to 5% by weight, based on formative components (A) to (C).

The impact modified thermoplastic TPU/PES molding materials according to the present invention can be prepared by any desired method for forming an essentially homogeneous composition from the TPU (A), the PES (B) and the graft rubber (C) and optionally the fillers (D) and assistants (E). For example, the formative components (A) to (C) and optionally (D) and/or (E) can be mixed at from 0° to 150° C., preferably at from 15° to 30° C., and then melted, or the components can be mixed directly in the melt. Alternatively, (A) can be mixed with (C) or (B) with (C) and these mixtures be incorporated into (B) or (A) respectively, in which case (D) and/or (E) may already be present in one of the formative components (A) to (C) or may be added subsequently.

The TPU/PES molding materials according to the present invention are prepared at from 190° to 250° C., preferably from 210° to 240° C., in the course of a residence time of from 0.5 to 10 minutes, preferably of from 0.5 to 3 minutes, in for example the fluent, softened or preferably molten state of formative components (A) to (C), for example by stirring, rolling, kneading or preferably extruding, using for example customary plasticating apparatus, e.g. Brabender or Banbury mills, kneaders and extruders, preferably a twin-screw extruder or a mixing extruder for transfer molding.

In the most convenient and therefore preferable method of preparation, the TPU (A), and PES (B) and the graft rubber (C) are mixed with or without (D) and/or (E) and melted together at 190°-250° C., preferably in an extruder, the melt has incorporated into it any component (D) and/or (E) not introduced earlier and is then cooled, and the resulting TPU/PES molding material is comminuted.

The TPU/PES molding material obtained according to the present invention are easy to process into shaped articles possessing good surface properties and improved impact toughness combined with high stiffness, in particular at low temperatures, without separation into components (A) or (B) or (C) occurring in the melt or in the molding.

The TPU/PES molding materials are also suitable for the extrusion of sheets, in particular thermoforming sheets.

EXAMPLES

Impact modified thermoplastic TPU/PES molding materials according to the present invention are prepared using the following components:

A) Thermoplastic polyurethane elastomers

A1: TPU having a Shore D hardness of 69 prepared by reaction of a mixture of 0.5 ml of 1,4-butanediol polyadipate of molecular weight 2000 and 5.86 mol of 1,4-butanediol with 4,4'-diphenylmethane diisocyanate in an NCO:OH group ratio of 1 at 80°-170° C. by the belt technique.

A2: TPU having a Shore D hardness of 74 prepared in the same way as A1 except that the NCO:OH group ratio used was 1.04.

A3: TPU having a Shore D hardness of 64 prepared in the same way as A1 except that 3.87 mol of 1,4-butanediol were used.

A4: TPU having a Shore A hardness of 90 prepared in the same way as A1, except that 1.7 mol of 1,4-butanediol were used.

A5: TPU having a Shore D hardness of 74 prepared by reacting a mixture of 0.5 mol of 1,4-butanediol-/ethylene glycol polyadipate having a 1,4-butanediol:ethylene glycol molar ratio of 1:1 and a molecular weight of 2000 and 5.66 mol of 1,4-butanediol with 4,4'-diphenylmethane diisocyanate in an NCO:OH group ratio of 1.

The above-described TPUs A1 to A5 each contain, based on the alkanediol polyadipate weight, 1% by weight of diisopropylphenylcarbodiimide as hydrolysis stabilizer.

A6: TPU having a Shore D hardness of 64 prepared by reaction of a mixture of 1 mol or polytetramethylene glycol or molecular weight 1000 and 3.87 mol of 1,4-butanediol with 4,4'-diphenylmethane diisocyanate in an NCO:OH group ratio of 1 at 90°-170° C. by the belt technique.

B) Thermoplastic polyesters

B1: Polyethylene terephthalate having a relative viscosity of 1.38 (measured on a 0.5% strength by weight solution in 1:1 w/w phenol/o-dichlorobenzene).

B2: Polybutylene terephthalate having a relative viscosity of 1.4, measured in the same way as B1.

C1) Graft rubbers based on polybutadiene

C1I: Graft rubber having a grafting base (75% by weight) of polybutadiene and a graft (25% by weight) of a copolymer of styrene and acrylonitrile in a weight ratio of 75:25, prepared by emulsion polymerization in a conventional manner. The medial particle diameter $d_{50}$, defined as the diameter which is respectively less than and greater than the diameter possessed by 50% of the particles, was 250 nm.

C1II: Graft rubber prepared in the same way as C1I, except that the graft is a copolymer of α-methylstyrene and acrylonitrile in a weight ratio of 75:25.

C1III: Graft rubber having a grafting base (70% by weight) of polybutadiene and a two-stage graft (in total 30% by weight), the 1st stage (10% by weight) being polystyrene and the 2nd stage (20% by weight) being a copolymer of methyl methacrylate, n-butyl acrylate and glycidyl methacrylate in a weight ratio of from 89:10:1. The graft polymer, which was prepared by emulsion polymerization in a conventional manner, has a median particle diameter $d_{50}$ of 240 μm.

C2) Graft rubber based on polyacrylate

C2I: Graft rubber having a grafting base (75% by weight) of a crosslinked poly-n-butyl acrylate and a graft (25% by weight) of a copolymer of styrene and acrylonitrile in a weight ratio of 75:25, prepared by emulsion polymerization in a conventional manner. The graft rubber had a median particle diameter $d_{50}$ of 210 μm.

C2II: Graft rubber having a grafting base (75% by weight) comprising a poly-n-butyl acrylate crosslinked with butanediol diacrylate and a graft (25% by weight) composed of a copolymer of styrene, acrylonitrile and tert-butyl acrylate in a weight ratio of 73:24:3. The graft rubber, which was prepared by emulsion polymerization in a conventional manner, had a median particle diameter $d_{50}$ of 420 μnm.

D) Fillers

E-Glass fibers in the form of a roving or in the form of chopped fiber. The glass fiber diameter was 10 μm.

PREPARATION OF THE IMPACT MODIFIED THERMOPLASTIC TPU/PES MOLDING MATERIALS

Examples 1 to 30 and Comparative Examples I to IV

To prepare the TPU/PES molding materials, components (A), (B) and (C) are intensively mixed at 23° C., the mixture is introduced into a twin-screw extruder and melted at 230° C., and the melt is homogenized for 2 minutes and then extruded into a water bath.

If E-glass fibers were used, these were incorporated into the homogenized melt in the form of chopped fibers or rovings.

Following granulation and drying, the TPU/PES molding materials were injection molded at 230° C. into test specimens on which measurements were carried out, without further aftertreatment, of the notched impact strength according to German Standard Specification DIN 53 453, the breaking extension according to German Standard Specification DIN 53 455 and the modulus of elasticity according to German Standard Specification DIN 53 457.

The identity and quantity of the TPUs (A), PES's (B) and graft rubbers (C1) and (C2) used and or any reinforcing fillers (D) and the mechanical properties measured on the test specimens are summarized below in Tables I and IV.

TABLE II

| | Materials used | | | | | | Mechanical properties | | |
| | TPU (A) | | PES (B) | | Graft rubber C1 | | Glass fibers | Modulus of elasticity | Notched impact strength [kJ/m²] | |
| Example | Amount [parts by weight] | Type | Amount [parts by weight] | Type | Amount [parts by weight] | Type | Amount [parts by weight] | [N/mm²] | 23° C. | −20° C. |
|---|---|---|---|---|---|---|---|---|---|---|
| 12 | 50 | A1 | 43 | B2 | 7 | C1III | 20 | 3100 | n.f.* | n.f.* |
| 13 | 50 | A3 | 43 | B2 | 7 | C1III | 20 | 4600 | 110 | 46 |
| 14 | 50 | A4 | 43 | B2 | 7 | C1III | 20 | 1900 | n.f.* | n.f.* |
| 15 | 50 | A6 | 43 | B2 | 7 | C1III | 20 | 4400 | n.f.* | 55 |
| 16 | 56 | A1 | 37 | B2 | 7 | C1III | 20 | 2800 | n.f.* | n.f.* |

*no fracture

TABLE I

| | Materials used | | | | | | Mechanical properties | | | | |
| | TPU (A) | | PES (B) | | Graft rubber C1 | | Modulus of elasticity | Notched impact strength [kJ/m²] | | | Breaking extension |
| | Amount [parts by weight] | Type | Amount [parts by weight] | Type | Amount [parts by weight] | Type | [N/mm²] | 23° C. | −20° C. | −30° C. | [%] |
|---|---|---|---|---|---|---|---|---|---|---|---|
| Comparative example | | | | | | | | | | | |
| I | 50 | A1 | 50 | B1 | — | — | 961 | 5.3 | 2.2 | 1.4 | 11 |
| II | 70 | A1 | 30 | B1 | — | — | 442 | 10 | 1.8 | 0.6 | 130 |
| III | 50 | A1 | 50 | B2 | — | — | 996 | 35 | 6.8 | 4.8 | 40 |
| IV | 70 | A1 | 30 | B2 | — | — | 388 | n.f.* | 10.8 | 7.3 | 220 |
| Example | | | | | | | | | | | |
| 1 | 50 | A1 | 40 | B1 | 10 | C1III | 871 | 26 | 8.2 | 5.2 | 180 |
| 2 | 70 | A1 | 20 | B1 | 10 | C1III | 405 | 52 | 16 | 7.4 | 320 |
| 3 | 50 | A1 | 40 | B2 | 10 | C1III | 892 | 44 | 12.1 | 7.6 | 310 |
| 4 | 70 | A1 | 20 | B2 | 10 | C1III | 342 | n.f.* | 18.4 | 12.6 | 360 |
| 5 | 50 | A2 | 40 | B2 | 10 | C1III | 905 | 56 | 14.3 | 8.7 | 320 |
| 6 | 50 | A3 | 40 | B2 | 10 | C1III | 1050 | 43 | 8.4 | 6.9 | 305 |
| 7 | 50 | A4 | 40 | B2 | 10 | C1III | 420 | n.f.* | 26 | 13.5 | 350 |
| 8 | 50 | A5 | 40 | B2 | 10 | C1III | 920 | 38 | 10.5 | 6.8 | 260 |
| 9 | 50 | A6 | 40 | B2 | 10 | C1III | 1020 | 48 | 10.4 | 8.5 | 295 |
| 10 | 50 | A3 | 40 | B2 | 10 | C1I | 1070 | 41 | 8.2 | 6.3 | 310 |
| 11 | 50 | A3 | 40 | B2 | 10 | C1II | 1060 | 45 | 11.3 | 8.2 | 320 |

*no fracture

TABLE III

| | Materials used | | | | | | Mechanical properties | | | | |
| | TPU (A) | | PES (B) | | Graft rubber C2 | | Modulus of elasticity | Notched impact strength [kJ/m²] | | | Breaking extension |
| Example | Amount [parts by weight] | Type | Amount [parts by weight] | Type | Amount [parts by weight] | Type | [N/mm²] | 23° C. | −20° C. | −30° C. | [%] |
|---|---|---|---|---|---|---|---|---|---|---|---|
| 17 | 50 | A1 | 40 | B1 | 10 | C2I | 882 | 28 | 8.8 | 4.6 | 210 |
| 18 | 70 | A1 | 20 | B1 | 10 | C2I | 423 | 55 | 18 | 6.8 | 360 |
| 19 | 50 | A1 | 40 | B2 | 10 | C2I | 910 | 48 | 13 | 7.2 | 350 |
| 20 | 70 | A1 | 20 | B2 | 10 | C2I | 364 | n.f.* | 20 | 10.8 | 390 |
| 21 | 50 | A2 | 40 | B2 | 10 | C2I | 916 | 55 | 14 | 7.6 | 380 |
| 22 | 50 | A4 | 40 | B2 | 10 | C2I | 430 | n.f.* | 19 | 11 | 410 |
| 23 | 50 | A1 | 40 | B2 | 10 | C2II | 905 | 45 | 16 | 7.5 | 370 |
| 24 | 50 | A6 | 40 | B2 | 10 | C2I | 956 | 55 | 14 | 9.8 | 375 |

TABLE III-continued

| | Materials used | | | | | | Mechanical properties | | | |
|---|---|---|---|---|---|---|---|---|---|---|
| | TPU (A) | | PES (B) | | Graft rubber C2 | | Modulus of elasticity | Notched impact strength [kJ/m²] | | Breaking extension |
| Example | Amount [parts by weight] | Type | Amount [parts by weight] | Type | Amount [parts by weight] | Type | [N/mm²] | 23° C. | −20° C. | −30° C. | [%] |
| 25 | 50 | A6 | 40 | B2 | 10 | C2II | 945 | 58 | 20 | 10.7 | 390 |

*no fracture

TABLE IV

| | Materials used | | | | | | Mechanical properties | | | |
|---|---|---|---|---|---|---|---|---|---|---|
| | TPU (A) | | PES (B) | | Graft rubber C2 | | Glass fibers | Modulus of elasticity | Notched impact strength [kJ/m²] | |
| Example | Amount [parts by weight] | Type | Amount [parts by weight] | Type | Amount [parts by weight] | Type | Amount [parts by weight] | [N/mm²] | 23° C. | −20° C. |
| 26 | 50 | A1 | 43 | B2 | 7 | C2I | 20 | 3100 | n.f.* | 95 |
| 27 | 50 | A2 | 43 | B2 | 7 | C2I | 20 | 3200 | n.f.* | n.f.* |
| 28 | 50 | A4 | 43 | B2 | 7 | C2I | 20 | 1800 | n.f.* | n.f.* |
| 29 | 50 | A6 | 43 | B2 | 7 | C2I | 20 | 4200 | n.f.* | 76 |
| 30 | 65 | A1 | 28 | B2 | 7 | C2I | 20 | 2900 | n.f.* | n.f.* |

*no fracture

We claim:

1. An impact modified thermoplastic polyurethane-polyester molding material containing, based on 100 parts by weight,
   A) from 30 to 90 parts by weight of at least one thermoplastic polyurethane elastomer (A),
   B) from 5 to 65 parts by weight of at least one thermoplastic polyester (B) and
   C) from 5 to 30 parts by weight of at least one graft rubber (C) which has a grafting base of 70% by weight polybutadiene and a 30% by weight two-stage graft of a first stage of 10% by weight of polystyrene and a second stage of 20% by weight of a copolymer of methyl methacrylate, n-butyl acrylate and glycidyl methacrylate in a weight ratio of from 89:10:1, and also, based on the total weight of (A) to (C),
   D) from 0 to 60% by weight of at least one fibrous or particulate filler and
   E) from 0 to 10% by weight of at least one additive selected from the group consisting of nucleating agents, anti-oxidants, stabilizers, lubricants, demolding agents and dyes.

2. An impact modified thermoplastic polyurethane-polyester molding material consisting of
   A) from 30 to 90 parts by weight of at least one thermoplastic polyurethane elastomer (A),
   B) from 5 to 65 parts by weight of at least one thermoplastic polyester (B) and
   C) from 5 to 30 parts by weight of at least one graft rubber (C) which has a grafting base of 70% by weight polybutadiene and a 30% by weight two-stage graft of a first stage of 10% by weight of polystyrene and a second stage of 20% by weight of a copolymer of methyl methacrylate, n-butyl acrylate and glycidyl methacrylate in a weight ratio of from 89:10:1,
   the proportions by weight of (A) to (C) adding up to 100 parts by weight, and also, based on the total weight of (A) to (C),
   D) from 0 to 60% by weight of at least one fibrous or particulate filler and
   E) from 0 to 10% by weight of at least one additive selected from the group consisting of nucleating agents, anti-oxidants, stabilizers, lubricants, demolding agents and dyes.

3. An impact modified thermoplastic polyurethane-polyester molding material as claimed in claim 1 or 2, wherein the thermoplastic polyurethane elastomer (A) is prepared by reaction of
   a) an organic diisocyanate with
   b) a polyhydroxy compound having a molecular weight of from 500 to 8000 and
   c) a diol having a molecular weight of from 60 to 400 in an equivalence ratio of NCO groups of organic diisocyanate (a) to the total number of hydroxyl groups of components (b) and (c) of from 0.95:1.0 to 1.1:1.0.

4. An impact modified thermoplastic polyurethane-polyester molding material as claimed in claim 1 or 2, wherein the thermoplastic polyurethane elastomer (A) is prepared by reaction of
   a) an aromatic diisocyanate, with
   b) an essentially linear polyhydroxy compound having from 2 to 6 carbon atoms in the alkylene moiety and a molecular weight of from 500 to 6000 or a hydroxyl-containing polytetrahydrofuran having a molecular weight of from 500 to 8000, and
   c) 1,4-butanediol.

5. An impact modified thermoplastic polyurethane-polyester molding material as claimed in claim 1 or 2, wherein the thermoplastic polyurethane elastomer (A) has a hardness within the range from Shore A 75 to Shore D 75 and is prepared by the belt technique.

6. An impact modified thermoplastic polyurethane-polyester molding material as claimed in claim 1 or 2, wherein the thermoplastic polyester (B) has a relative viscosity within the range form 1.2 to 1.8, measured in a 0.5% strength by weight solution in 1:1 w/w phenol-/o-dichlorobenzene at 25° C., and is prepared by polycondensation of an aromatic dicarboxylic acid with an alkanediol having 2 to 6 carbon atoms in the alkylene moiety.

7. An impact modified thermoplastic polyurethane-polyester molding material as claimed in claim 1 or 2, wherein the thermoplastic polyester (B) is polyethylene terephthalate or polybutylene terephthalate.

* * * * *